Figure 1A:
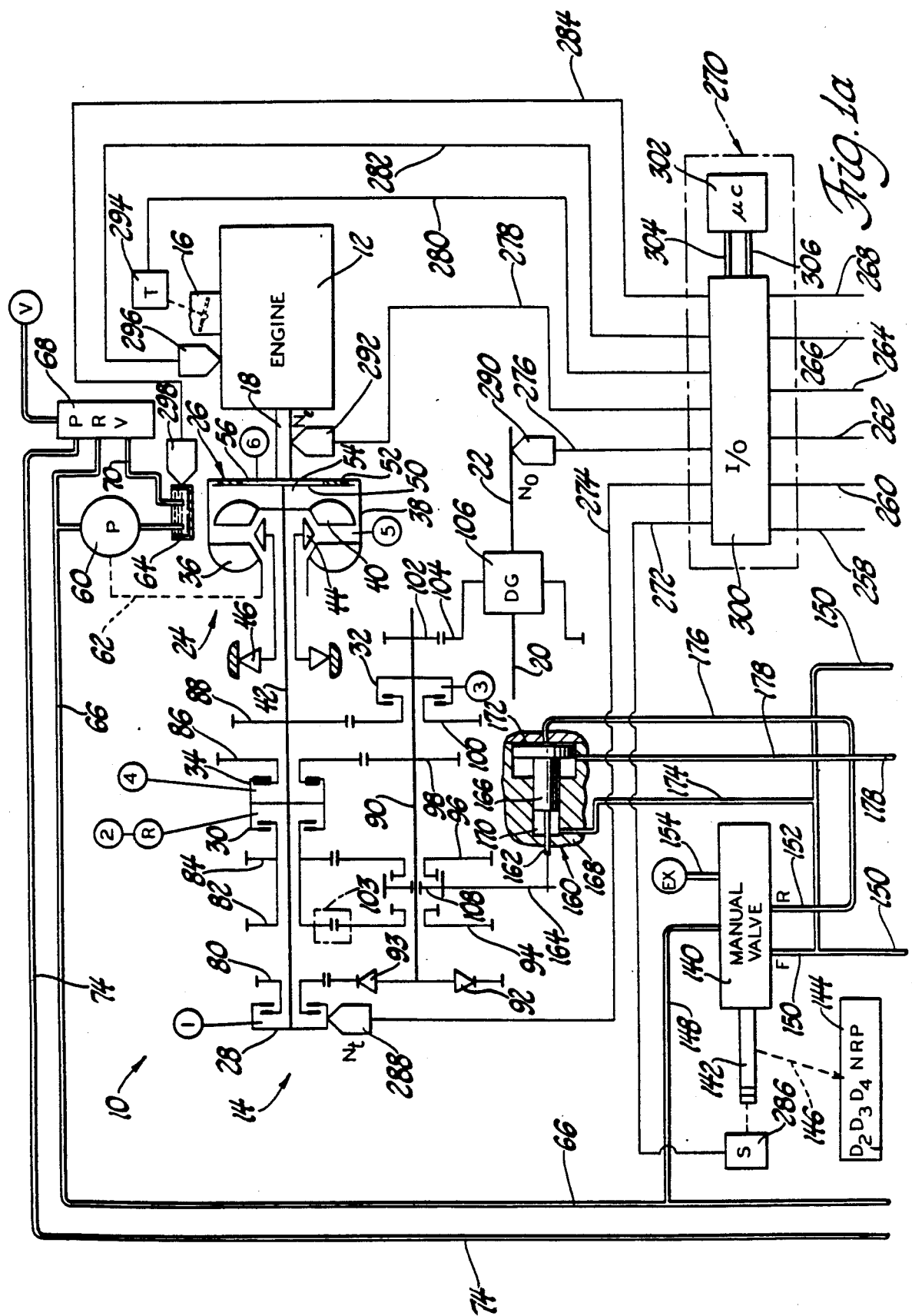

United States Patent [19]

Downs et al.

[11] Patent Number: 4,671,139

[45] Date of Patent: Jun. 9, 1987

[54] CLUTCH-TO-CLUTCH COAST DOWNSHIFTING IN A MOTOR VEHICLE AUTOMATIC TRANSMISSION

[75] Inventors: Robert C. Downs, Ortonville; Larry T. Nitz, Troy; Frederick K. Reichert, Auburn Hills; Joseph L. Wanamaker, Rochester, all of Mich.

[73] Assignee: General Motors Corporation, Detroit, Mich.

[21] Appl. No.: 822,397

[22] Filed: Jan. 27, 1986

[51] Int. Cl.[4] .............................................. B60K 41/06
[52] U.S. Cl. ........................................ 74/866; 74/861; 74/733; 364/424.1
[58] Field of Search ................. 74/733, 866, 865, 861; 364/424.1

[56] References Cited

U.S. PATENT DOCUMENTS

| | | | |
|---|---|---|---|
| 3,752,011 | 8/1973 | Casey et al. | 74/866 X |
| 3,776,048 | 12/1973 | Enomoto et al. | 74/866 |
| 4,034,627 | 7/1977 | Mizote | 74/866 |
| 4,223,573 | 9/1980 | Franssen | 74/866 |
| 4,228,700 | 10/1980 | Espenschied et al. | 74/866 |
| 4,408,293 | 10/1983 | Avins | 364/424.1 X |
| 4,476,745 | 10/1984 | Moan | 74/866 |
| 4,497,222 | 2/1985 | Nagaoka et al. | 74/866 |
| 4,514,811 | 4/1985 | Daubenmier et al. | 364/424.1 |
| 4,520,694 | 6/1985 | Eschrich et al. | 74/866 X |
| 4,539,643 | 9/1985 | Sazuki et al. | 364/424.1 |

FOREIGN PATENT DOCUMENTS

| | | | |
|---|---|---|---|
| 103141 | 8/1980 | Japan | 74/866 |
| 40052 | 3/1984 | Japan | 74/866 |
| 2053387 | 2/1981 | United Kingdom | 74/866 |
| 2057603 | 4/1981 | United Kingdom | 74/866 |
| 2134608 | 8/1984 | United Kingdom | 74/866 |

Primary Examiner—Leslie Braun
Assistant Examiner—Dwight G. Diehl
Attorney, Agent, or Firm—Mark A. Navarre

[57] ABSTRACT

Clutch-to-clutch downshifts in the course of a coast mode of operation are effected by releasing the off-going clutching device at a time determined in relation to the vehicle speed and deceleration rate, and applying the on-coming clutching device a predetermined time thereafter such that the apply occurs when the engine speed is substantially equal to the transmission input speed in the downshifted speed ratio. The predetermined time defines an neutral interval during which the on-coming clutching device is filled with hydraulic fluid in preparation for engagement, and the engine speed assumes its neutral idle value. At the end of the predetermined time, the engine speed and the transmission input speed in the downshifted speed ratio are at the neutral idle value, and the on-coming clutching device is applied to complete the shift.

13 Claims, 14 Drawing Figures

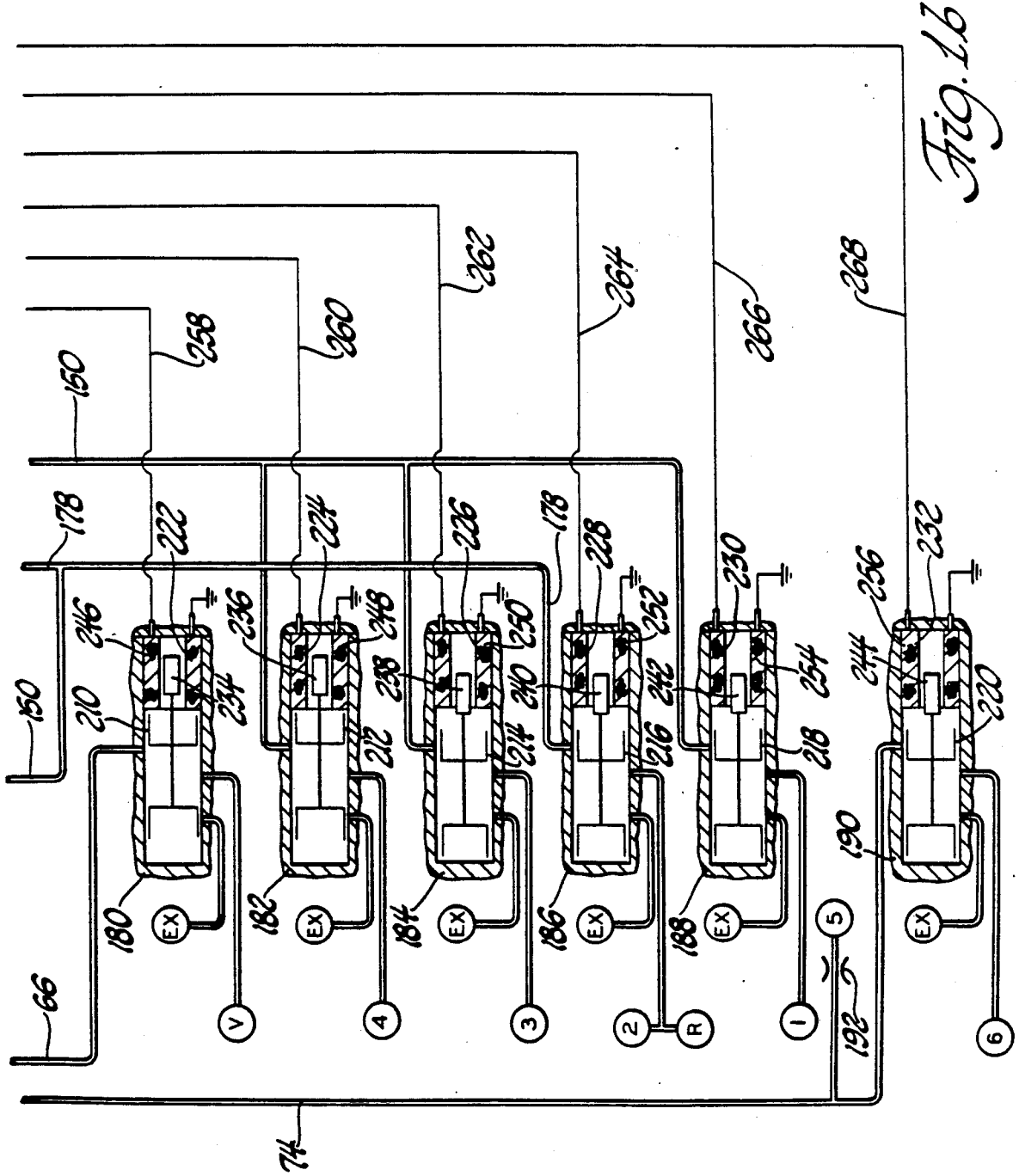

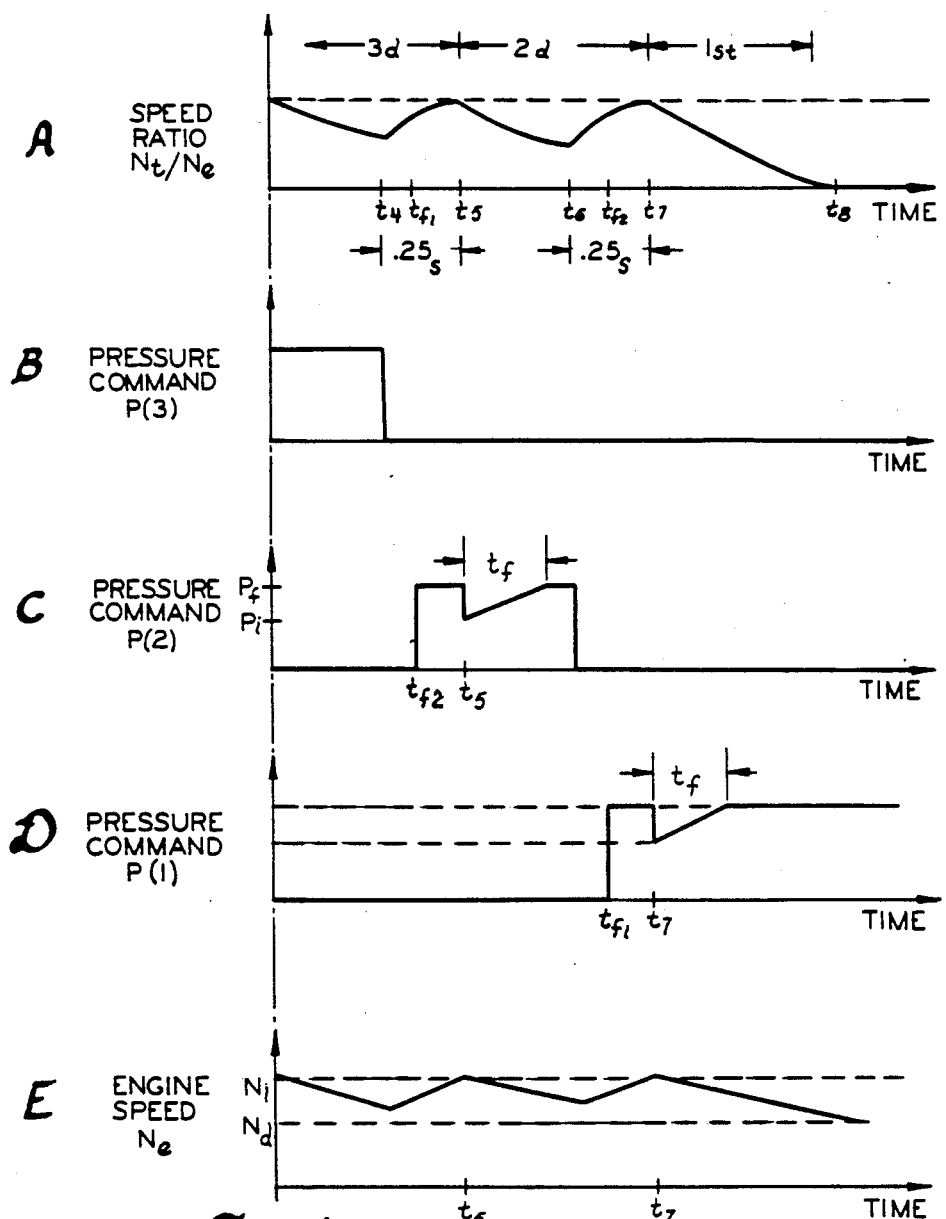
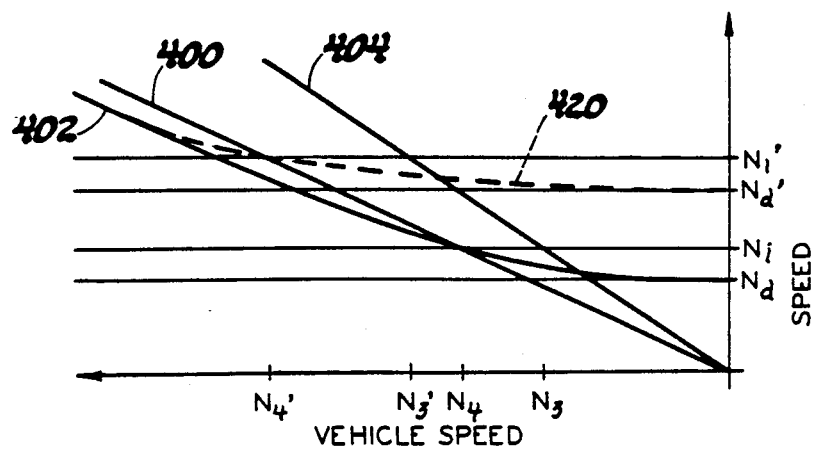

CLUTCH-TO-CLUTCH COAST DOWNSHIFTING IN A MOTOR VEHICLE AUTOMATIC TRANSMISSION

This invention relates to an electronic controller for a motor vehicle automatic transmission, and more particularly to a control method for effecting clutch-to-clutch downshifts when the vehicle is in a coast mode of operation.

Motor vehicle transmissions generally include an input shaft coupled to the vehicle engine, an output shaft coupled to the drive wheels, and selectively engageable gear elements for providing two or more forward speed ratios between the input and output shafts. The speed ratios are determined by the relative sizes of the gear elements and are typically defined in terms of the expression $N_i/N_o$, where $N_i$ represents the input shaft speed, and $N_o$ represents the output shaft speed.

In automatic transmissions, the engine is connected to the input shaft through a fluid coupling such as a torque converter, and the gear elements which provide the various speed ratios are selectively activated by fluid operated torque establishing devices such as clutches and brakes. The brake can be of the band or disk type; engineering personnel in the automotive art refer to the disk type brakes in transmissions as clutches or clutching devices.

Shifting from one forward speed ratio to another generally involves releasing (disengaging) the clutching device associated with the current speed ratio and applying (engaging) the clutching device associated with the desired speed ratio. The clutching device to be released is referred to as the off-going clutch, while the clutching device to be applied is referred to as the on-coming clutching device. Shifts performed in this manner are referred to as clutch-to-clutch shifts in that no speed responsive or one-way clutching devices are used. The clutching devices are activated in accordance with vehicle speed and engine load conditions so that the transmission is upshifted to successively lower numerical speed ratios ($N_i/N_o$) as the vehicle speed is increased, and downshifted to successively higher numerical speed ratios as the vehicle speed is decreased.

This invention relates to the control of clutch-to-clutch downshifting in conditions where the engine load is minimal and the vehicle speed is decreasing. This condition is referred to herein as coasting, and includes situations in which the operator uses the service brakes to augment the rate of speed decrease.

When performing coast downshifts, the objective is to time the shift so as to minimize driveline disruption while maintaining engagement of a speed ratio that will provide adequate performance in the event the operator terminates the coast by increasing the engine throttle setting. Ideally, this means that the transmission should be successively downshifted as the vehicle speed is decreased and that each such downshift should be performed so that the engine speed before and after the shift is substantially the same.

A long neutral interval between the release of an off-going clutching device and the apply of an on-coming clutching device is unacceptable because a finite amount of time is required to prepare the on-coming clutching device, and the engine will accelerate unrestrained if the operator terminates the coast by increasing the engine throttle setting. The control problem is further compounded by variation in the engine idle speed and vehicle deceleration rate.

Accordingly, the primary object of this invention is to provide an improved transmission control system for effecting clutch-to-clutch downshifts in vehicle coast conditions, wherein the engine speed before and after each downshift is substantially the same, and neutral idle intervals are minimized.

It is a further object of this invention to provide an improved transmission control system as set forth above wherein the downshift timing is compensated for variations in the engine idle speed.

It is a further object of this invention to provide an improved transmission control system as set forth above wherein the downshifts are scheduled in relation to the vehicle deceleration rate.

These and other objects are carried forward with an electronic control system that regulates the fluid pressure supplied to each of the clutching devices. Downshifts in the course of a coast mode of operation are effected by releasing the off-going clutching device at a time determined in relation to the vehicle speed and deceleration rate, and applying the on-coming clutching device a predetermined time thereafter such that the apply occurs when the engine speed is substantially equal to the transmission input speed in the downshifted speed ratio.

The predetermined time defines a neutral interval during which neither the off-going nor the on-coming clutching devices are engaged and the engine speed assumes its neutral idle value. In the course of the neutral interval, the on-coming clutching device is filled with hydraulic fluid in preparation for engagement. The duration of the predetermined time is thus scheduled in relation to both the time required for the engine speed to return to its neutral idle value and the time required for the filling of the on-coming clutching device. At the end of the predetermined time, the engine speed and the transmission input speed in the downshifted speed ratio are at the neutral idle value, and the on-coming clutching device is applied to complete the shift. This sequence is repeated for each successive downshift until the coast mode of operation is terminated or the transmission is downshifted to its lowest speed ratio.

According to a further aspect of this invention, variations in the engine idle speed are compensated for by obtaining a measure of the engine idle speed in the course of each period of coast operation. More particularly, the speed ratio across the torque converter is monitored following the onset of coast operation, and the point of zero torque transfer thereacross is identified. At such point, the engine and transmission input shafts are rotating at the same speed, the engine neutral idle speed. Such speed is captured, and used in the timing of downshifts which occur in the course of that coast period.

A further aspect of the present invention relates to the scheduling of downshifts in the course of a coast mode of operation. Broadly, successive ratio downshifts (i.e., 4–3, 3–2, etc.) are eliminated where the scheduled apply of the on-coming clutching device falls within the predetermined time period preceding a further downshift. In such cases, the deceleration rate is relatively high, and the neutral interval is extended until the coast mode is terminated or a downshift to the lowest speed ratio can be scheduled.

IN THE DRAWINGS

FIGS. 1a and 1b schematically depict a computer based electronic transmission control system for carrying out the teachings of this invention.

Figure 2:
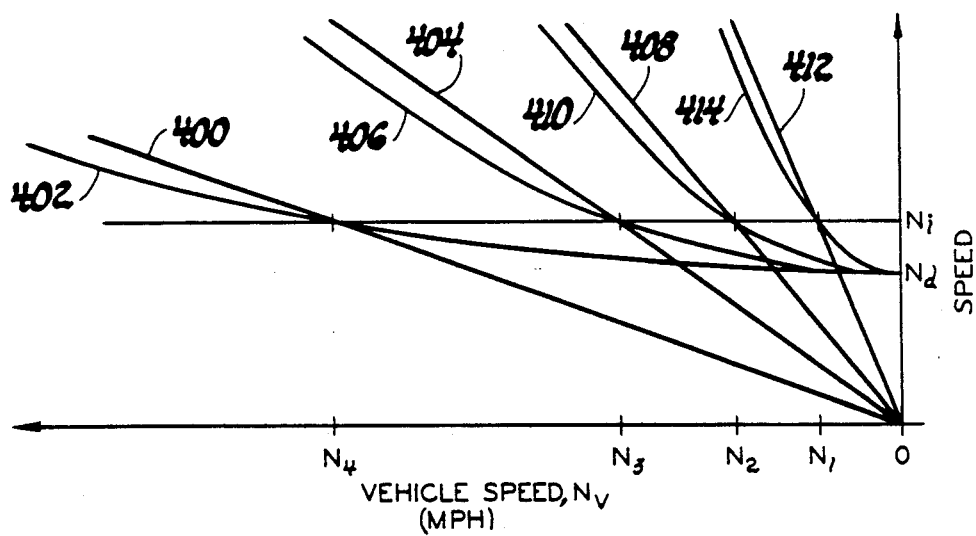

FIG. 2 graphically depicts characteristic engine and transmission operation in the course of a period of coasting.

Figure 3:
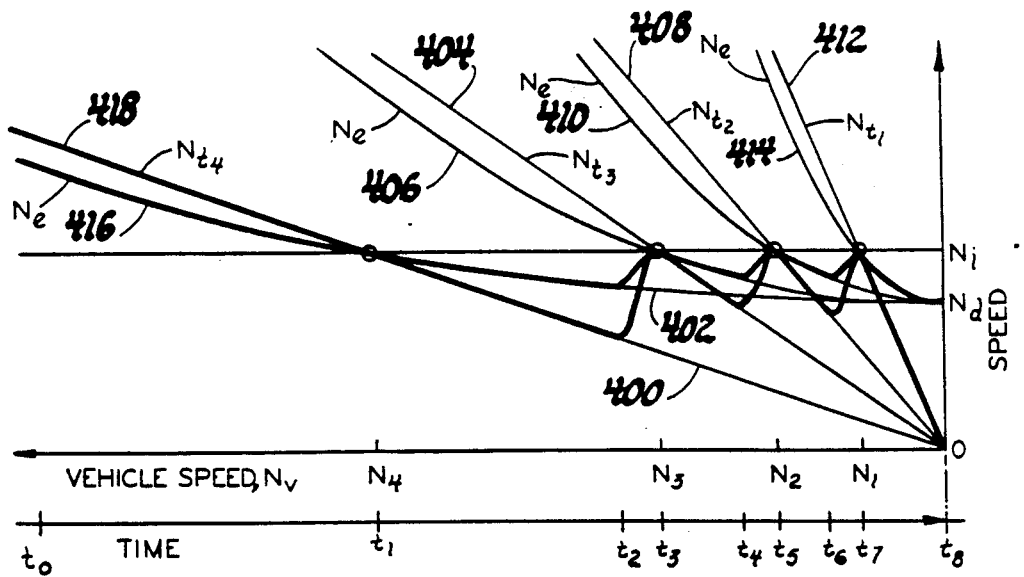

FIGS. 3 and 4 graphically depict successive single ratio downshifts performed in accordance with this invention.

Figure 6:
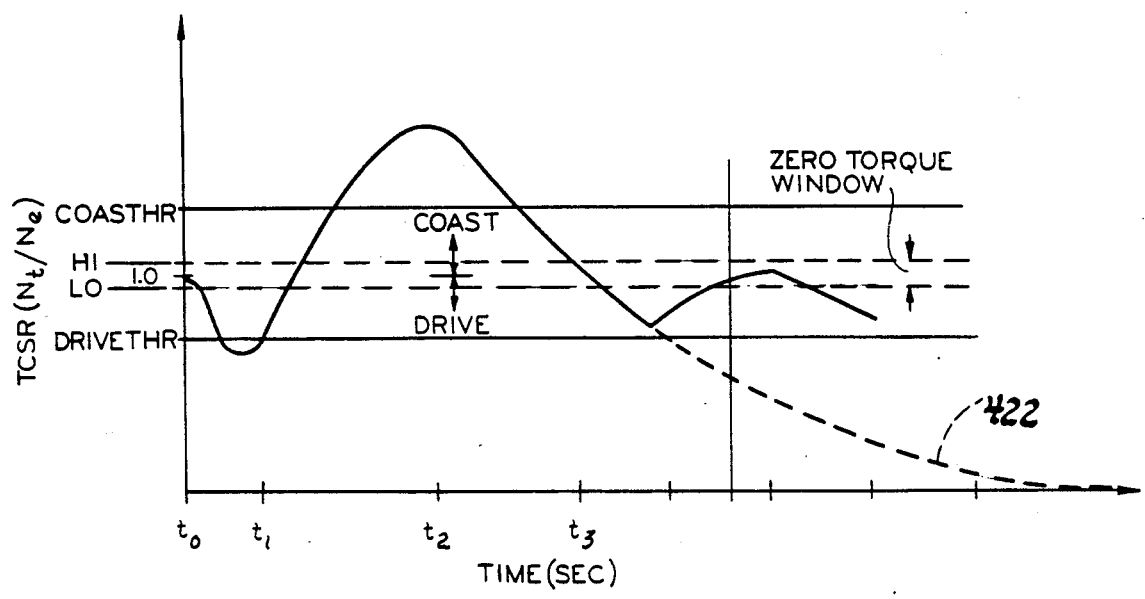

FIGS. 5 and 6 graphically depict characteristic engine and transmission operation in the course of a coast, and identification of the engine neutral idle speed according to this invention.

Figure 7:
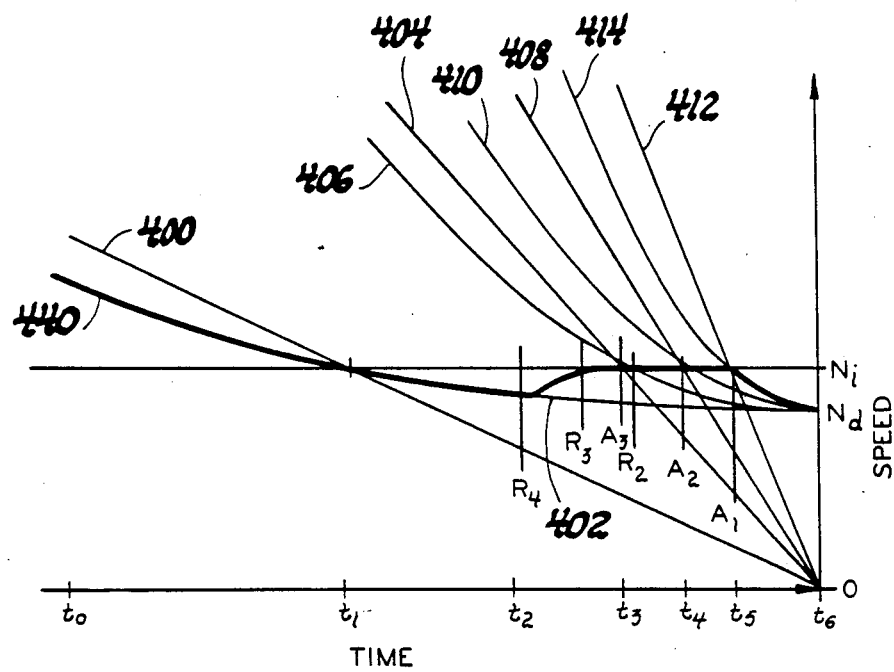

FIG. 7 graphically depicts a coast operation at a relatively high deceleration rate in which certain normally scheduled downshifts are eliminated.

FIGS. 8-11 are flow diagrams representative of computer program instructions to be executed by the computer based control unit of FIG. 1 in carrying out the control functions of this invention.

Referring now to the drawings, and more particularly to FIGS. 1a and 1b, the reference numeral 10 generally designates a motor vehicle drive train including an engine 12 and a parallel shaft transmission 14 having a reverse speed ratio and four forward speed ratios. Engine 12 includes a throttle mechanism 16 mechanically connected to an operator manipulated device such as an accelerator pedal (not shown) for regulating engine output torque, such torque being applied to the transmission 14 through the engine output shaft 18.

The transmission 14 transmits engine output torque to a pair of drive axles 20 and 22 through a torque converter 24 and one or more of the fluid operated clutching devices 26-34, such clutching devices being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14.

The torque converter 24 also includes a clutching device 26 comprising a clutch plate 50 secured to the shaft 42. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56. When the fluid pressure in the apply chamber 54 exceeds that in the release chamber 56, the friction surface 52 of clutch plate 50 is moved into engagement with the input shell 38 as shown in FIG. 1, thereby engaging the clutching device 26 to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is removed out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36 as indicated by the broken line 62. Pump 60 receives hydraulic fluid at low pressure from the fluid reservoir 64 and supplies pressurized fluid to the transmission control elements via output line 66.

A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74.

While the pump and pressure regulator valve designs are not critical to the present invention, a representative pump is disclosed in the U.S. patent to Schuster U.S. Pat. No. 4,342,545 issued Aug. 3, 1982, and a representative pressure regulator valve is disclosed in the U.S. patent to Vukovich U.S. Pat. No. 4,283,970 issued Aug. 18, 1981, such patents being assigned to the assignee of the present invention.

The transmission shaft 42 and a further transmission shaft 90 each have a plurality of gear elements rotatably supported thereon. The gear elements 80-88 are supported on shaft 42 and the gear elements 92-102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28-34 each comprise an input member rigidly connected to a transmission shaft 42 or 90, and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28-34 is biased toward a disengaged state by a return spring (not shown). Engagement of the clutching device is effected by supplying fluid pressure to an apply chamber thereof. The resulting torque capacity of the clutching device is a function of the applied pressure less the return spring pressure, hereinafter referred to as the working pressure $P_w$. The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80–88 and 92–100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28–34 in a released condition. The speed ratios defined by the various gear element pairs are generally characterized by the ratio of the turbine speed $N_t$ to output speed $N_o$. Representative $N_t/N_o$ ratios for transmission 14 are as follows:

| | |
|---|---|
| First - 2.368 | Second - 1.273 |
| Third - 0.808 | Fourth - 0.585 |
| | Reverse - 1.880 |

As indicated above, shifting from a current forward speed ratio to a desired forward speed ratio requires that the clutching device associated with the current speed ratio (off-going) be disengaged and the clutching device associated with the desired speed ratio (on-coming) be engaged. For example, a shift from the first forward speed ratio to the second forward speed ratio involves disengagement of the clutching device 28 and engagement of the clutching device 30. As explained below, the timing of such disengagement and engagement is critical to the attainment of high quality shifting, and this invention is directed to a control system for supplying fluid pressure to the various clutching devices 28–34 to consistently achieve high quality coast downshifts.

The fluid control elements of the transmission 14 include a manual valve 140, a directional servo 160 and a plurality of electrically operated fluid valves 180–190. The manual valve 140 operates in response to operator demand and serves, in conjunction with directional servo 160, to direct regulated line pressure to the appropriate fluid valves 182–188. The fluid valves 182–188, in turn, are individually controlled to direct fluid pressure to the clutching devices 28–34. The fluid valve 180 is controlled to direct fluid pressure from the pump output line 66 to the pressure regulator valve 68, and the fluid valve 190 is controlled to direct fluid pressure from the line 74 to the clutching device 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148 and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3, or D2 positions shown on the indicator mechanism 144, line pressure from the line 148 is directed to the forward (F) output line 150. When the shaft 142 is in the R position shown on the indicator mechanism 144, line pressure from the line 148 is directed to the reverse (R) output line 152. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172. When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1 to engage the dog clutch 108 with the gear element 94 for enabling engagement of the reverse speed ratio. In each case, it will be remembered that the actual engagement of the forward or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180–190 each receive fluid pressure at an input passage thereof from the pump 60, and are individually controlled to direct fluid pressure to the pressure regulator valve 68 or respective clutching devices 26–34. The fluid valve 180 receives line pressure directly from pump output line 66, and is controlled to direct a variable amount of such pressure to the pressure regulator valve 68 as indicated by the circled letter V. The fluid valves 182, 184 and 188 receive fluid pressure from the forward output line 150 of manual valve 140, and are controlled to direct variable amounts of such pressure to the clutching devices 34, 32 and 28 as indicated by the circled numerals 4, 3 and 1, respectively. The fluid valve 186 receives fluid pressure from the forward output line 150 and the directional servo output line 178, and is controlled to direct a variable amount of such pressure to the clutching device 30 as indicated by the circled numeral 2 and the circled letter R. The fluid valve 190 receives fluid pressure from line 74 of pressure regulator valve 68, and is controlled to direct a variable amount of such pressure to the release chamber 56 of the clutching device 26 as indicated by the circled numeral 6. The apply chamber 54 of the clutching device 26 is supplied with fluid pressure from the output line 74 via the orifice 192 as indicated by the circled numeral 5.

Each of the fluid valves 180–190 includes a spool element 210–220, axially movable within the respective valve body for directing fluid flow between input and output passages. When a respective spool element 210–220 is in the rightmost position as viewed in FIG. 1, the input and output passages are connected. Each of the fluid valves 180–190 includes an exhaust passage as indicated by the circled letters EX, such passage serving to drain fluid from the respective clutching device when the spool element is shifted to the leftmost position as viewed in FIG. 1. In FIG. 1, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines. Each of the fluid valves 180–190 includes a solenoid 222–232 for controlling the position of its spool element 210–220. Each such solenoid 222–232 comprises a plunger 234–244 connected to the respective spool element 210–220 and a solenoid coil 246–256 surrounding the respective plunger. One terminal of each such solenoid coil 246–256 is connected to ground potential as shown, and the other terminal is connected to an output line 258–268 of a control unit 270 which governs the solenoid coil energization. As set forth hereinafter, the control unit 270 pulse-width-modulates the solenoid coils 246–256 according to a predetermined control algorithm to regulate the fluid pressure supplied to the pressure regulator 68 and the clutching devices 26–34, the duty cycle of such modulation being determined in relation to the desired magnitude of the supplied pressures.

While the fluid valves 180–190 have been illustrated as spool type valves, other types of valves could be substituted therefor. By way of example, and without limitation, valves of the ball and seat type could be used. In general terms, the fluid valves 180–190 may be mechanized with any three-port pulse-width-modulated valving arrangement.

Input signals for the control unit 270 are provided on the input lines 272–284. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276, and 278, respectively. The speed transducer 288 senses the velocity of the transmission shaft 42 and therefore the turbine or transmission input speed $N_t$; the speed transducer 290 senses the velocity of the drive axle 22 and therefore the transmission output speed $N_o$; and the speed transducer 292 senses the velocity of the engine output shaft 18 and therefore the engine speed $N_e$. The position transducer 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284.

The control unit 270 responds to the input signals on input lines 272–284 according to a predetermined control algorithm as set forth herein, for controlling the energization of the fluid valve solenoid coils 246–256 via output lines 258–268. As such, the control unit 270 includes an input/output (I/O) device 300 for receiving the input signals and outputting the various pulse-width-modulation signals, and a microcomputer 302 which communicates with the I/O device 300 via an address-and-control bus 304 and a bidirectional data bus 306. Flow diagrams representing suitable program instructions for developing the pulse-width-modulation outputs in accordance with the teachings of this invention are depicted in FIGS. 8–11.

The characteristic operation of engine 12 and transmission 14 during coasting is graphically illustrated in FIG. 2, where the turbine and engine speed traces for each of the four forward speed ratios of transmission 14 are depicted as a function of vehicle speed $N_v$. The traces 400 and 402 represent the turbine and engine speeds, respectively, for the highest or fourth speed ratio; the traces 404 and 406 represent the turbine and engine speeds, respectively, for the third speed ratio; the traces 408 and 410 represent the turbine and engine speeds, respectively, for the second speed ratio; and the traces 412 and 414 represent the turbine and engine speeds, respectively, for the lowest or first speed ratio.

The neutral idle speed $N_i$ is the speed at which the engine 12 operates when the transmission 14 is in Neutral. The drive idle speed $N_d$ is the speed at which the engine 12 operates when the vehicle speed is zero and any one of the clutching devices associated with a forward speed ratio is engaged.

When the onset of a coast operation is sensed, the control unit 270 releases the torque converter clutching device 26, if engaged, to permit operation of torque converter 24. Thereafter, the relative speeds of the engine 12 and turbine 40 reflect the direction of the torque being transmitted through the torque converter 24. Regardless of the speed ratio in effect, the release of clutching device 26 initially allows the engine speed to rise above the turbine speed. Shortly thereafter, however, the engine speed decreases below the turbine speed as the engine begins to supply negative or braking torque to the vehicle through the torque converter 24. The engine 12 continues to supply braking torque through the torque converter 24 until the engine slows to its neutral idle speed $N_i$. At such time, the turbine and engine speeds $N_t$ and $N_e$ coincide, and no torque is transmitted through torque converter 24. The terms $N_4$, $N_3$, $N_2$, and $N_1$ on the vehicle speed axis represent the speeds at which such coincidence occurs. Thereafter, the turbine 36 begins rotating faster than the impeller 40, and the sign of the torque transmitted through torque converter 24 reverses. If no downshift is performed, the turbine speed $N_t$ decreases to zero with the vehicle speed $N_v$, and the engine speed $N_e$ decreases to its drive idle value $N_d$.

In conventional transmission controls, downshifting during coasting is generally postponed until the vehicle speed is relatively low so as to minimize the driveline disturbances associated with shifting. The disadvantage of such control is that the transmission is usually in the wrong speed ratio if the operator terminates the coast operation before the vehicle is brought to a stop by increasing the engine throttle setting. This degrades the performance of the vehicle because a speed ratio shift has to be performed before the engine torque is transmitted to the drive axles 20 and 22.

In contrast to the conventional controls referred to above, the control system of the present invention performs successive downshifts in the course of coast operation so that the transmission is in a more suitable speed ratio if and when the operator terminates the coast operation. Moreover, the downshifts are scheduled so that the engine speed before and after each shift is substantially the same, and the driveline disturbance occasioned thereby is minimized.

FIG. 3 graphically depicts successive 4–3, 3–2 and 2–1 downshifts during coast operation according to this invention. The engine and turbine speeds for the various speed ratios are identified by the traces 400–414 as in FIG. 2; the actual engine and turbine speeds in the course of the coast operation coincide with portions of the traces 400–414, and are depicted by the heavy traces 416 and 418. The neutral idle and drive idle speeds $N_i$ and $N_d$ as well as the terms $N_4$, $N_3$, $N_2$, and $N_1$ are set forth as in FIG. 2.

A time axis parallel to the vehicle speed axis denotes the times $t_0$–$t_8$. The time $t_0$ corresponds to a point relatively early in the coast operation, and the time $t_8$ corresponds to the point at which the vehicle speed $N_v$ is reduced to zero. The time $t_1$ corresponds to the vehicle speed $N_4$; the time $t_3$ corresponds to the vehicle speed $N_3$; the time $t_5$ corresponds to the vehicle speed $N_2$; and the time $t_7$ corresponds to the vehicle speed $N_1$.

Between times $t_0$ and $t_2$, the fourth forward speed ratio of transmission 14 is engaged, and the turbine speed $N_t$ and engine speed $N_e$ follow the traces 400 and 402, respectively. When $N_t$ and $N_e$ coincide at time $t_1$, the engine is operating at its neutral idle speed $N_i$. As set forth below, the turbine (or engine) speed is measured at such time according to this invention to provide an indication of the current value of $N_i$.

Following time $t_1$, the control unit 270 periodically predicts future turbine speed values $PTS_3$, $PTS_2$, and $PTS_1$ for the third, second and first speed ratios of transmission 14. The predicted turbine speed $PTS_n$ for a given speed ratio n calculated at time t is an estimate of the turbine speed that would occur at time $(t+T_p)$ if the speed ratio n were engaged, where $T_p$ is a predetermined time interval. As explained below, the predetermined time $T_p$ is closed in relation to the dynamics of engine 12 and the required fill times of the various clutching devices.

Time $t_3$ represents the time at which the predicted turbine speed $PTS_3$ for the third speed ratio coincides with the engine neutral idle speed $N_i$. Similarly, time $t_5$ represents the time at which the predicted turbine speed $PTS_2$ coincides with $N_i$, and time $t_7$ represents the time at which the predicted turbine speed $PTS_1$ coincides with $N_i$. Thus, the intervals $(t_3-t_2)$, $(t_5-t_4)$, and $(t_7-t_6)$ each have a duration equal to the predetermined time, $T_p$. In the illustrated embodiment, the predetermined time $T_p$ has a value of 0.25 seconds.

The predicted turbine speeds are computed as a function of the vehicle deceleration a, the current vehicle speed $N_v$, the reference time interval $T_p$, and the $N_t/N_o$ ratio defined by the respective speed ratios. Algebraically, the predicted turbine speed $PTS_n$ for a given speed ratio n is computed according to the following expression:

$$PTS_n = [N_v + (a*T_p)]*(N_t/N_o)_n$$

For the transmission depicted in FIG. 1, the predicted turbine speeds $PTS_1$, $PTS_2$, and $PTS_3$ for the first, second, and third speed ratios are thus given as follows:

$$PTS_1 = [N_v + (a*0.25)]*2.368$$

$$PTS_2 = [N_v + (a*0.25)]*1.273$$

$$PTS_3 = [N_v + (a*0.25)]*0.808$$

The engine neutral idle speed $N_i$ identified at time $t_1$ is continuously compared to the predicted turbine speed for the downshifted speed ratios. When $N_i$ coincides with $PTS_n$, it means that a downshift to the speed ratio n should occur in $T_p$ seconds. When such coincidence is detected, the clutching device associated with the presently engaged speed ratio is released, thereby permitting the engine speed to increase or float up to its neutral idle value $N_i$. At the expiration of the time interval $T_p$ the engine speed should be substantially at the neutral idle value, and the clutching device associated with the speed ratio n is applied to effect the downshift.

Thus, the 4–3 downshift is effected by releasing the clutching device 34 at time $t_2$, and applying the clutching device 32 at time $t_3$. In the neutral interval between the release and apply, the clutching device 32 is prepared for engagement, and the engine and turbine speeds rise to the neutral idle speed $N_i$. Similarly, the 3–2 downshift is effected by releasing the clutching device 32 at time $t_4$, and applying the clutching device 30 at time $t_5$; the 2–1 downshift is effected by releasing the clutching device 30 at time $t_6$, and applying the clutching device 28 at time $t_7$. In the neutral interval between each release and apply, the clutching device associated with the downshifted speed ratio (on-coming) is filled in preparation for engagement, as engine speed and turbine speeds $N_e$ and $N_t$ rise substantially to the neutral idle speed $N_i$. After the clutching device 28 is applied to engage the first speed ratio, the turbine speed $N_t$ decreases to zero along the trace 412, and the engine speed $N_e$ decreases to its drive idle value $N_d$ along the trace 414.

The torque converter speed ratio $N_t/N_e$ and the pressure commands for the clutching devices 28–32 during the 3–2 and 2–1 downshifts are also shown in Graphs A-E of FIG. 4, where the time designations $t_4$–$t_8$ are as set forth in FIG. 3. Graph A depicts the speed ratio $N_t/N_e$ across the torque converter 24; Graph B depicts the fluid pressure command P(3) for the third speed ratio clutching device 32; Graph C depicts the fluid pressure command P(2) for the second speed ratio clutching device 30; Graph D depicts the fluid pressure command P(1) for the first speed ratio clutching device 28; and Graph E depicts the engine speed $N_e$. As seen in Graphs C and D, the filling of the clutching device 30 occurs in the interval $t_{f2}-t_5$, and the filling of the clutching device 28 occurs in the interval $t_{f1}-t_7$.

In view of the above, it will be seen that the predetermined time $T_p$ must be chosen in relation to two constraints. First, the time $T_p$ must be sufficiently long to permit the engine speed $N_e$ to return to its neutral idle value from a somewhat lower value following the release of the respective off-going clutching device. Second, it must be sufficiently long to permit the on-coming clutching device to be filled. In any event, the time $T_p$ should be as short as possible in order to minimize the neutral intervals. In a mechanization of the present invention in a production vehicle, we have found the first constraint to be controlling. In such mechanization, the time $T_p$ was set at 0.25 sec. for all coast downshifts.

In each of the downshifts described above, the engine and turbine speeds before and after the apply of the respective on-coming clutching device are substantially the same. As a result, clutching device does not have to overcome the inertia of the engine, and the driveline disturbance associated with the shift is minimized. Moreover, the performance of the vehicle at the termination of the coast operation is enhanced because the successive downshifting in the course of the coast operation places the transmission in a more suitable speed ratio for effecting acceleration of the vehicle than would otherwise occur with conventional controls.

As set forth above, a further aspect of the present invention relates to the identification of the engine neutral idle speed $N_i$ in the course of each coast operation. If the neutral idle speed $N_i$ remained constant throughout the vehicle operation, there would be no need to measure it, and all coast downshifting could be timed in relation to the vehicle speeds $N_3$, $N_2$, and $N_1$ set forth in FIGS. 2 and 3. However, the neutral idle speed of a motor vehicle engine varies significantly with temperature and accessory loading during a typical period of operation. FIG. 5 graphically illustrates how variation in the neutral idle speed changes the optimum timing of a coast downshift.

More particularly, FIG. 5 depicts turbine and engine speed traces for two different neutral idle speeds $N_i$ and $N_i'$, assuming engagement of the fourth forward speed ratio. Corresponding drive idle speeds $N_d$ and $N_d'$ are also shown. The turbine and engine speeds $N_t$ and $N_e$ corresponding to the neutral idle speed $N_i$ are depicted by the solid traces 400 and 402 as in FIGS. 2-3; the engine speed $N_e'$ corresponding to the neutral idle speed $N_i'$ is depicted by the broken trace 420. The turbine speed $N_t$ is directly related to the vehicle speed and does not vary with the neutral idle speed. The turbine speed $N_t$ for the third speed ratio is depicted by the trace 404 as in FIGS. 2 and 3. On the vehicle speed axis, the term $N_4$ corresponds to the point at which the turbine and engine speed traces 400 and 402 coincide at neutral idle speed $N_i$ as in FIGS. 2-3; the term $N_4'$ corresponds to point at which the turbine and engine speed traces 400 and 420 coincide at neutral idle speed $N_i'$. If the engine neutral idle speed is $N_i$, the on-coming clutching device 32 for the third speed ratio should be applied at vehicle speed $N_3$ in order to perform a minimum disruption 4-3 downshift in accordance with this invention. If the engine neutral idle speed is $N_i'$, the clutching device 32 should be applied at a significantly higher vehicle speed $N_3'$. Thus, vehicle speed cannot be a basis for the timing of coast downshifting if the downshifts are carried out according to this invention for achieving minimum driveline disruption.

According to this invention, the engine neutral idle speed is determined in the course of each coast operation by monitoring the speed ratio $N_t/N_e$ across the torque converter 24 in the early portion of the coast, and identifying the point at which the ratio is unity—that is, time $t_1$ in FIG. 3. The mechanism for identifying the engine neutral idle speed according to this invention is illustrated graphically in FIG. 6, where the the speed ratio $N_t/N_e$ across torque converter 24 is depicted as a function of time for a period of coast operation. For the purpose of the illustration, it is assumed that the torque converter clutching device 26 is engaged prior to the coast operation. In such case, the engine torque is transmitted through the clutching device 26 as opposed to the torque converter 24, and the speed ratio $N_t/N_e$ across the torque converter 24 is 1:1, or unity.

At time $t_0$, coast operation (closed throttle deceleration) is detected, and the control unit 270 releases the clutching device 26 to permit operation of torque converter 24. Thereafter, the relative speeds of the engine 12 and turbine 40 reflect the direction of the torque being transmitted through the torque converter 24. The release of clutching device 26 allows the engine speed to flare, and the ratio $N_t/N_e$ decreases below unity, indicating that the engine is supplying some driving torque to the vehicle through the torque converter 24. Shortly thereafter at time $t_1$, the engine speed decreases, and the speed ratio $N_t/N_e$ increases above unity as the engine begins to supply negative or braking torque to the vehicle through the torque converter 24. At time $t_2$, the vehicle speed begins decreasing faster than the engine speed, and the ratio $N_t/N_e$ begins decreasing toward zero. As the ratio $N_t/N_e$ decreases, the engine supplies less and less braking torque, until at time $t_3$, the ratio reaches unity. At such time, the engine is at its neutral idle speed and the impeller 36 of torque converter 24 begins rotating faster than the turbine 40. As a result, the torque transmitted through torque converter 24 reverses as the engine 12 once again begins supplying positive torque to the vehicle through the torque converter 24. If no downshift were performed, the turbine speed $N_t$, and therefore the ratio $N_t/N_e$, would thereafter decrease to zero as the vehicle slowed to a stop as indicated by the broken trace 422. If a coast downshift were performed, the release of the clutching device 34 would permit the ratio $N_t/N_e$ to float back to unity in the ensuing neutral interval as shown by the solid trace and by the $N_t/N_e$ trace of Graph 4A.

Identification of the engine neutral idle speed $N_i$ according to this invention involves defining a zero torque window about the unity torque converter speed ratio, and capturing the engine or turbine speed as the ratio $N_t/N_e$ passes through the window at time $t_3$. Such window is defined as seen in FIG. 6 by the ratio values HI and LO disposed about the ratio of 1.0. The term COASTHR is a calibrated value significantly greater than the upper window limit HI. When the measured ratio $N_t/N_e$ becomes greater than the value of COASTHR in the course of a coast operation, the first passage of the ratio through the zero torque window (time $t_1$) has already occurred, and the mechanism for capturing the engine neutral idle speed is enabled. The term DRIVETHR is a calibrated value significantly lower than the lower window limit LO, and is used in connection with a check of the reasonableness of the stored neutral idle speed $N_i$. The mechanization of the neutral idle speed capturing technique is described below in reference to the flow diagrams of FIGS. 11-12.

In practice, the control unit 270 stores a running estimate of the neutral idle speed $N_i$. At the initiation of vehicle operation, an estimate of $N_i$ is stored based on the expected operation of the engine speed control system and typical accessory loading. In subsequent coast operation, the stored value is adjusted into agreement with the actual neutral idle speed as explained below in reference to the flow diagram of FIG. 9b.

In instances where the deceleration rate is relatively high, there may not be enough time to complete all of the successive downshifts. In such case, certain of the downshifts may be skipped. The heavy trace 440 in FIG. 7 represents the engine speed in the course of coast operation under relatively high vehicle deceleration. The engine and turbine speed traces 400-414 from FIGS. 2-3 are also shown. As with the coast depicted in FIG. 3, the fourth speed ratio is engaged initially at time $t_0$, and the engine speed trace follows the path of the engine speed trace 402. Also as in FIG. 3, the engine neutral idle speed $N_i$ is captured at time $t_1$ as the engine and turbine speeds coincide. At time $t_2$, the predicted turbine speed $PTS_3$ for the third speed ratio is substantially equal to the captured neutral idle speed, and the control unit 270 releases the clutching device 34. Normally, the clutching device 32 for the third speed ratio would be applied $T_p$ seconds later at time $t_3$. Due to the relatively high vehicle deceleration, however, the predicted turbine speed $PTS_2$ for the second speed ratio becomes substantially equal to the neutral idle speed $N_i$ prior to time $t_3$. Since the release of the third speed ratio clutching device 32 is indicated prior to its scheduled engagement, a 4-3 shift is not appropriate, and the apply of clutching device 32 is skipped. As such, the engine speed remains at the neutral idle value $N_i$.

If a 4-3 shift is not appropriate, the control unit 270 determines if a 4-2 shift is appropriate. The apply of the second ratio clutching device 30 would normally occur at time $t_4$, $T_p$ seconds after the scheduled release of the third speed ratio clutching device 32. In the illustrated example, however, the predicted turbine speed $PTS_2$ for the second speed ratio becomes substantially equal to the neutral idle speed $N_i$ prior to time $t_4$. Since the release of the second speed ratio clutching device 30 is indicated prior to its scheduled engagement, a 4-2 shift is not appropriate and the apply of the clutching device 30 is skipped. As such the engine speed remains at the neutral idle value $N_i$.

If a 4-2 shift is not appropriate, the control unit 270 effects a 4-1 shift at the time $t_5$, $T_p$ seconds after the point where the predicted turbine speed $PTS_1$ for the first speed ratio became substantially equal to the neutral idle speed $N_i$. Such shift is effected by applying the first speed ratio clutching device 28. Thereafter, the engine speed follows the engine speed trace 414 until the drive idle speed $N_d$ is reached at time $t_6$.

Figure 8:
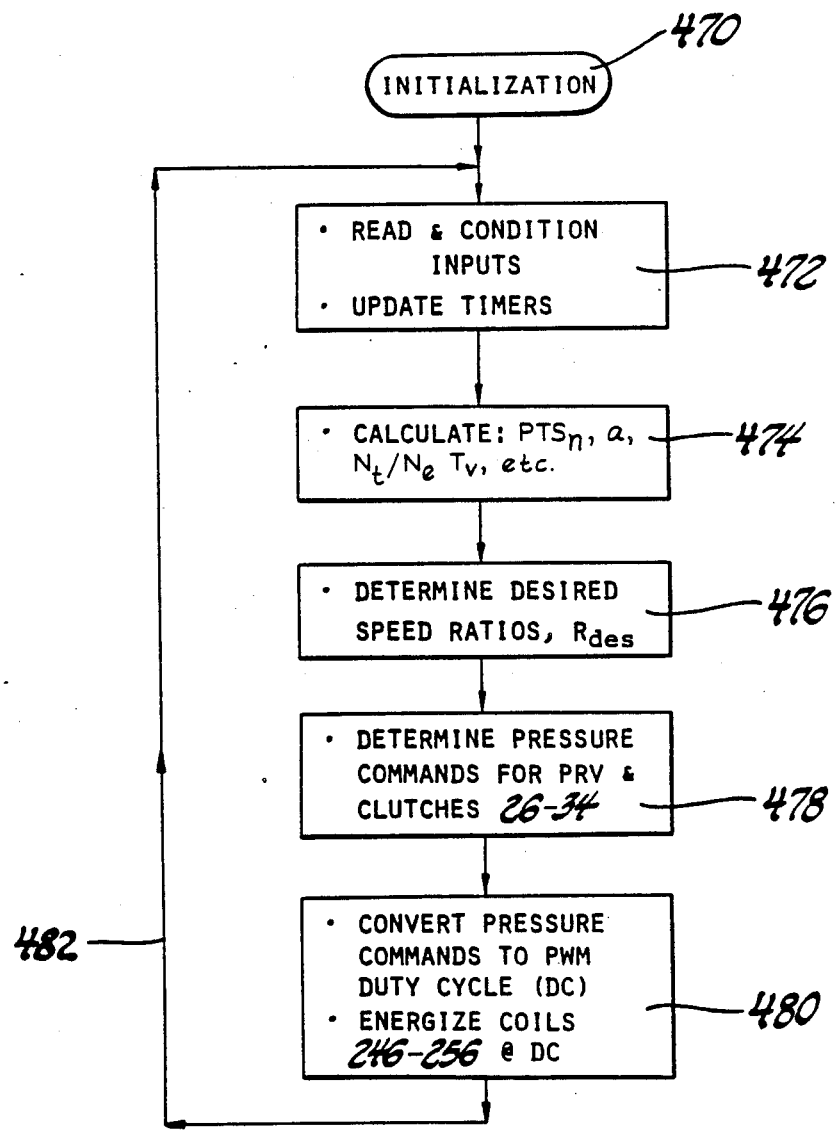
Figure 9A:
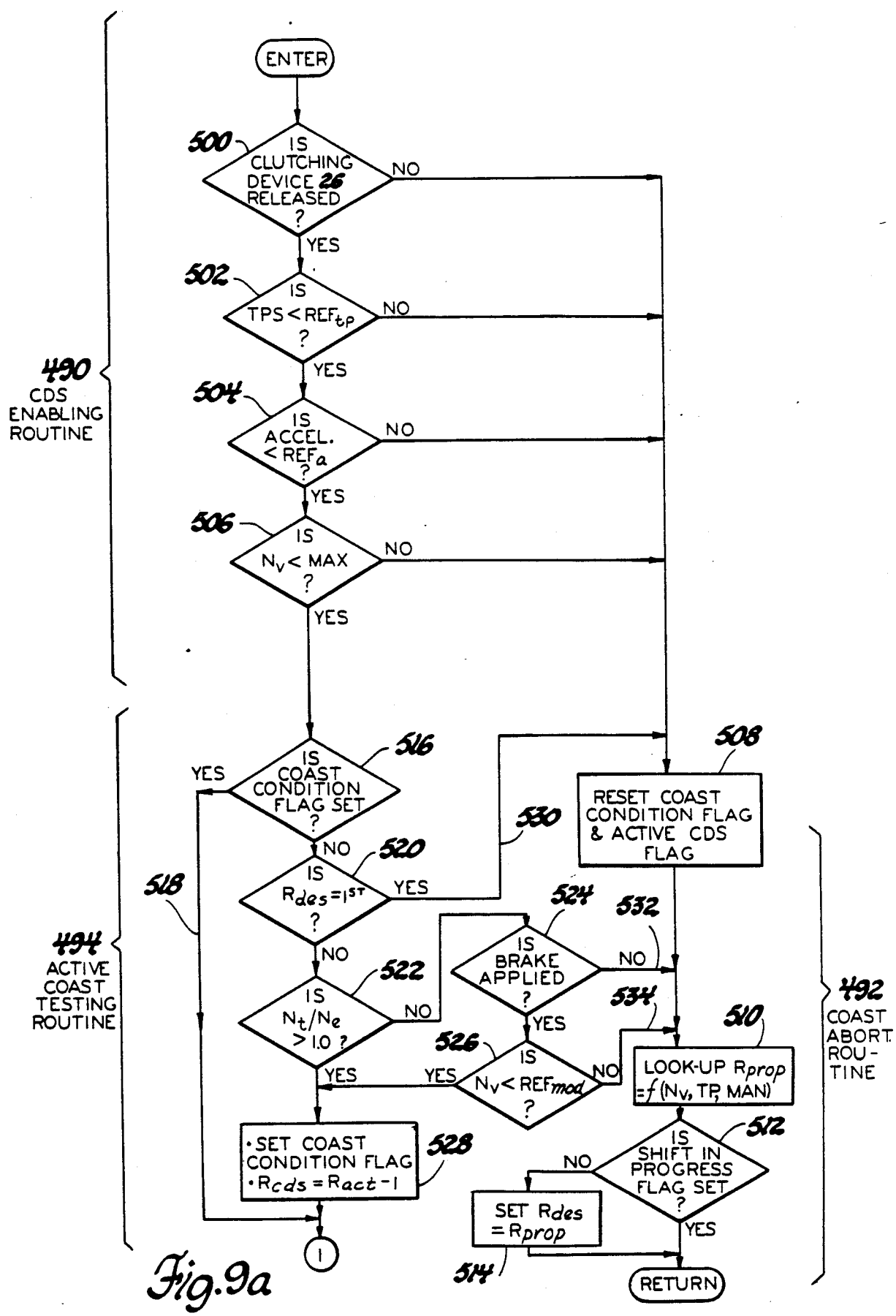
Figures 9B, 9C:
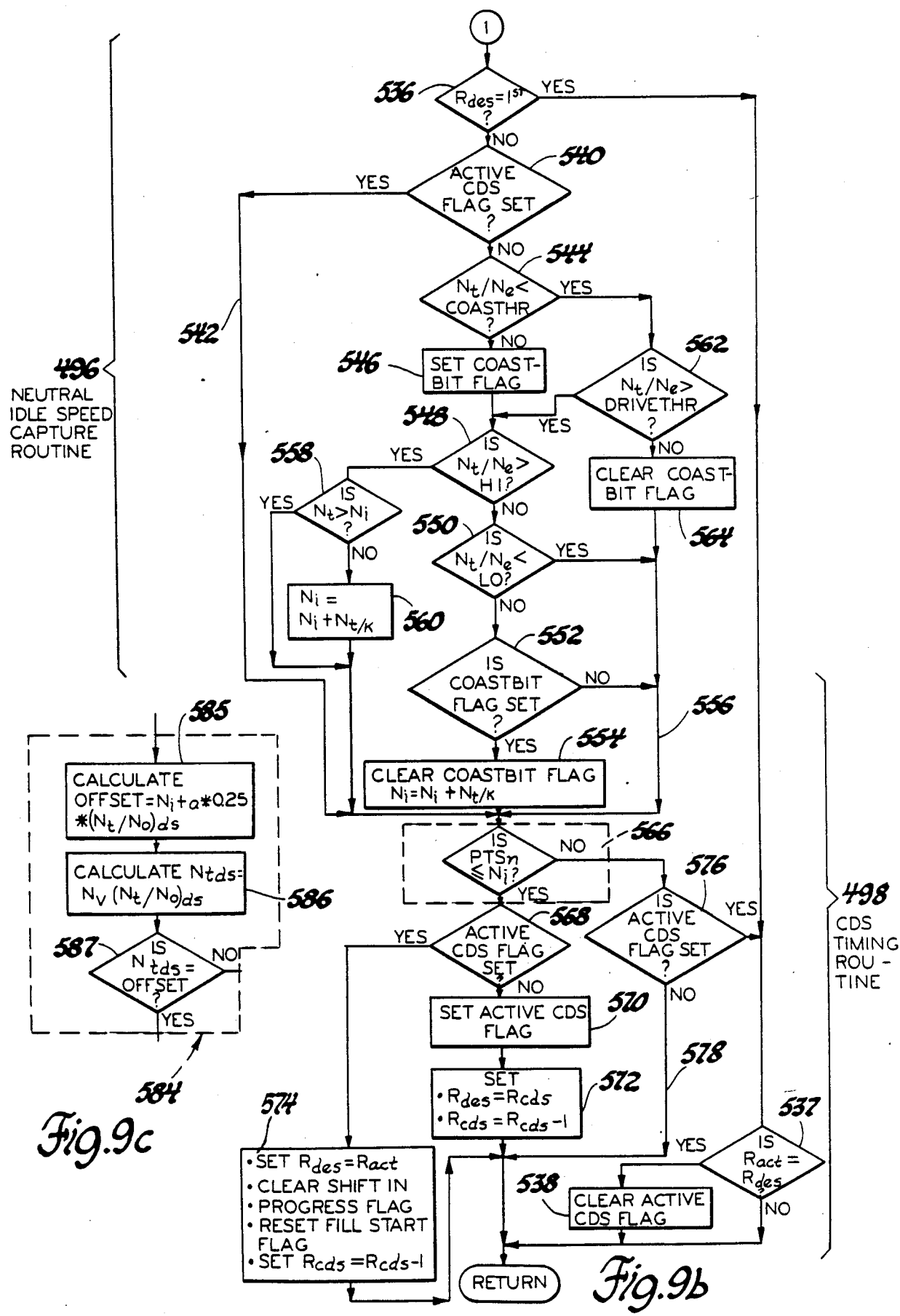
Figure 10:
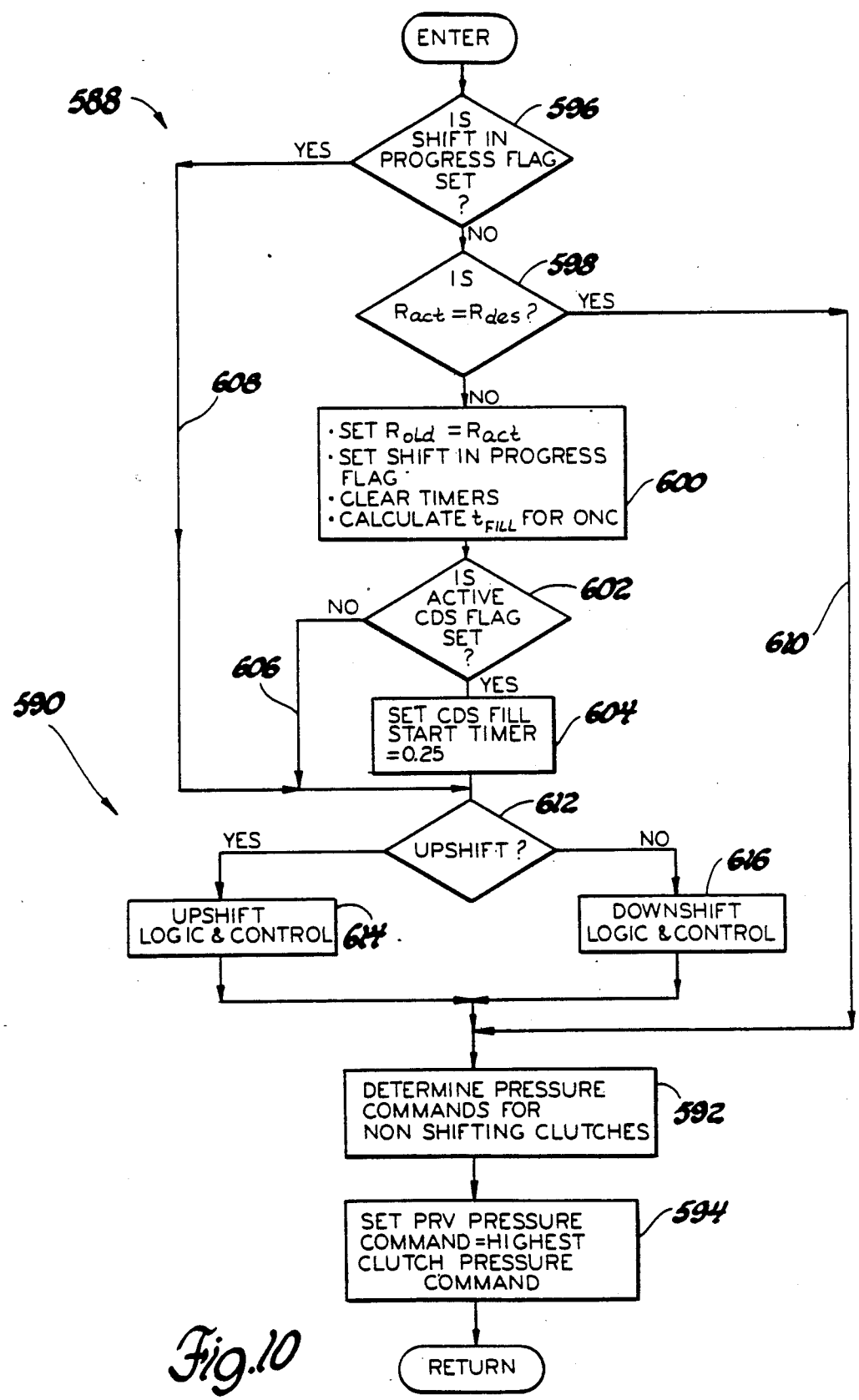
Figure 11:
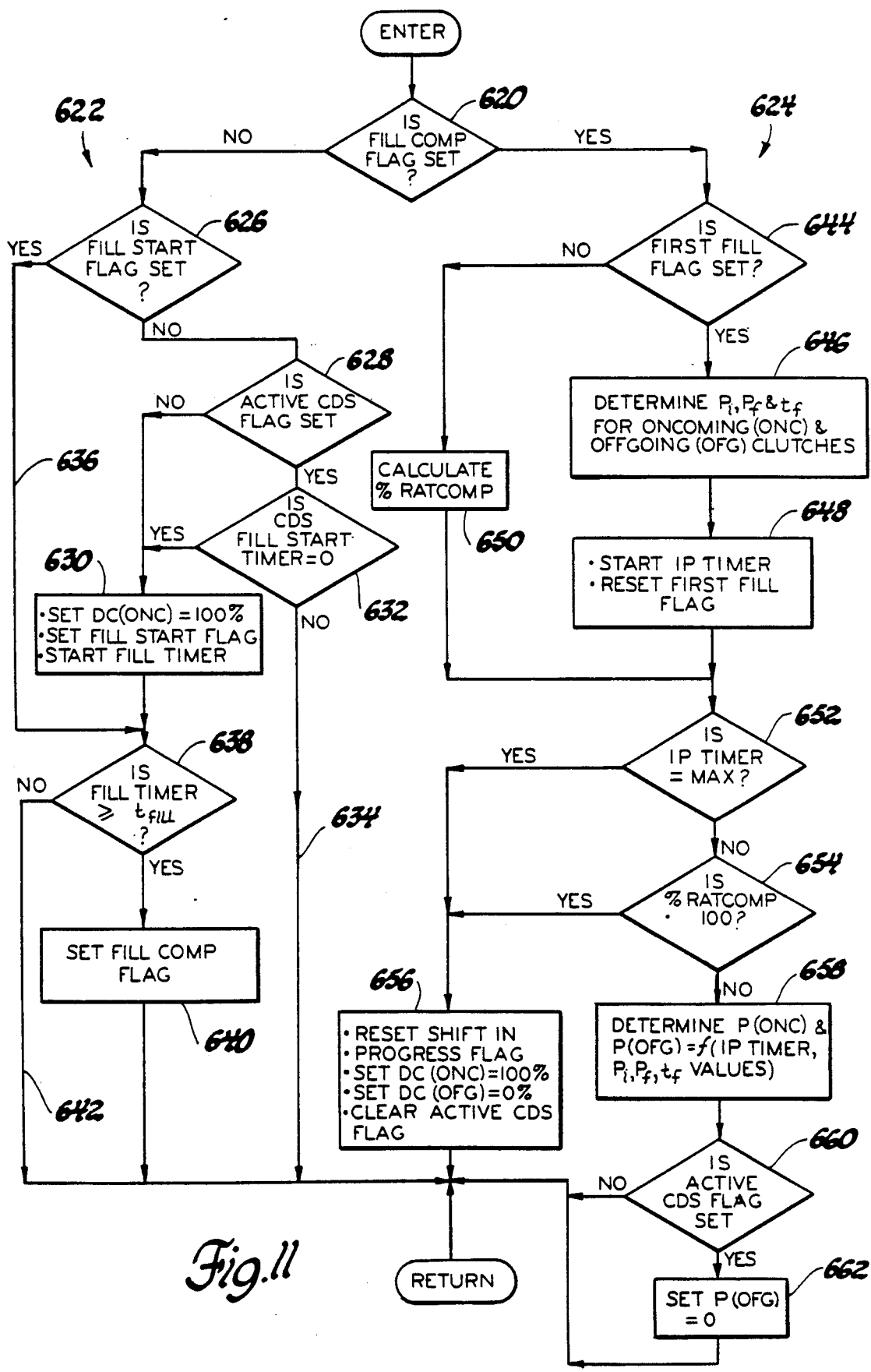

FIGS. 8-11 depict flow diagrams representative of program instructions to be executed by the control unit 270 for carrying out the control functions of this invention. The flow diagram of FIG. 8 represents a main or executive program which calls various subroutines for executing particular control functions as necessary. The flow diagrams of FIGS. 9-11 represent the functions performed by those subroutines which are more pertinent to the present invention.

Referring now more particularly to FIG. 8, the reference numeral 470 designates a set of program instructions executed at the initiation of each period of vehicle operation for initializing the various registers, timers, etc. used in carrying out the control functions of this invention. Following such initialization, the instruction blocks 472-480 are repeatedly executed in sequence as designated by the flow diagram lines connecting such instruction blocks and the return line 482. Instruction block 472 reads and conditions the various input signals applied to I/O device 300 via the lines 272-280, and updates (increments) the various control unit timers. Instruction block 474 calculates various terms used in the control algorithms, including the predicted turbine speeds $PTS_n$, the vehicle acceleration a, the speed ratio $N_t/N_e$, and an engine torque related variable $T_v$. The algebraic expressions used to compute the predicted turbine speeds $PTS_n$ are given above in reference to FIG. 3. Instruction block 476 determines the desired speed ratio, $R_{des}$, a function generally referred to as shift pattern generation. In noncoast operation, $R_{des}$ is determined in a conventional manner in accordance with throttle position, vehicle speed, and manual valve position; in coast operation, $R_{des}$ is determined in accordance with this invention to achieve minimum driveline disruption downshifting. Instruction block 478 determines the clutching device pressure commands for effecting a ratio shift, if required. The pressure commands for the pressure regulator valve PRV and nonshifting clutching devices are also determined. Instruction block 480 converts the clutching device and PRV pressure commands to PWM duty cycle based on empirically determined operating characteristics of the various actuators, and energizes the actuator coils accordingly.

The flow diagrams depicted in FIGS. 9-11 expand on certain of the main flow diagram instruction blocks. Shift pattern generation—instruction block 476 in FIG. 8—is expanded on in the flow diagrams of FIGS. 9a-9c. Pressure command determination—instruction block 478 in FIG. 8—is expanded on in the flow diagrams of FIGS. 10-11.

The shift pattern generation flow diagram of FIGS. 9a-9b includes a coast downshift (CDS) enabling routine 490, a coast abort routine 492, an active coast testing routine 494, a neutral idle speed capture routine 496, and a CDS timing routine 498.

The coast enabling routine 490 comprises the decision blocks 500-506 for defining the enabling conditions for a coast downshift. The decision block 500 determines if the torque converter clutching device 26 is released; the decision block 502 determines if the engine throttle position is less than a reference value, $REF_{tp}$ corresponding to a nearly closed position; the decision block 504 determines if the vehicle acceleration is less than a relatively low reference, $REF_a$; and the decision block 506 determines if the vehicle speed $N_v$ is less than a relatively high reference, MAX. If all of the decision blocks 500-506 are answered in the affirmative, the enabling conditions are met and the active coasting routine 494 is executed to determine if a coast condition should be established. If any of the decision blocks 500-506 are answered in the negative, the coast abort routine 492 is executed to cancel the coast condition.

The coast abort routine 492 includes the blocks 508-514 and is executed when either the CDS enabling routine 490 or the active coast testing routine 494 indicate that coast downshift control is not appropriate. The instruction block 508 is first executed to reset the "COAST CONDITION" and "ACTIVE CDS" flags. As set forth below, the status of the "COAST CONDI- TION" flag is determined by the active coast testing routine 494, and the status of the "ACTIVE CDS" flag is determined by the CDS timing routine 498. The instruction block 510 is then executed to determine the proposed speed ratio, $R_{prop}$, based on the vehicle speed $N_v$, the throttle position TP, and the position, MAN, of manual valve 140. Then the decision block 512 is executed to determine if the "SHIFT IN PROGRESS" flag is set. As described below in reference to FIGS. 10-11, the "SHIFT IN PROGRESS" flag is set and reset by the shift control routines to indicate the status of a shift. If the "SHIFT IN PROGRESS" flag is not set, the instruction block 514 is then executed to set the desired speed ratio term $R_{des}$ equal to the proposed ratio term, $R_{prop}$; otherwise, the execution of instruction block 514 is skipped, completing the routine.

The active coast testing routine 494 is executed after it is determined that coast enabling conditions are present. On entering the routine, the decision block 516 is executed to determine if the "COAST CONDITION" flag is set. If so, the active coast tests have already been met, and execution of the remainder of the routine is skipped, as indicated by the flow diagram line 518. If not, the decision blocks 520-526 are executed to perform the active coast tests. The decision block 520 determines if the desired speed ratio $R_{des}$ is first; decision block 522 determines if the ratio $N_t/N_e$ across torque converter 24 is greater than unity; decision block 524 determines if the vehicle brake is applied; and decision block 526 determines if the vehicle speed $N_v$ is less than a moderate reference speed $REF_{mod}$.

If the desired speed ratio $R_{des}$ is other than the first speed ratio and the ratio $N_t/Ne$ is greater than unity, the instruction block 528 is executed to set the "COAST CONDITION" flag and to set the target coast downshift ratio $R_{cds}$ equal to one ratio lower than the present ratio $R_{act}$. If the desired speed ratio $R_{des}$ is first, a coast condition cannot be established, and the coast abort routine 492 is executed as indicated by the flow diagram line 530.

Similarly, if the ratio $N_t/N_e$ is less than unity and the vehicle brakes are not applied, or the vehicle speed is greater than $REF_{mod}$, a coast condition cannot be established and the coast abort routine is executed as indicated by the flow diagram lines 532 or 534. In such case, it is not necessary to executed instruction block 508 since neither the "COAST CONDITION" flag nor the "ACTIVE CDS" flag would have been set. If the vehicle brakes are applied and the vehicle speed is less than $REF_{mod}$, the instruction block 528 is executed to set the coast downshift ratio $R_{cds}$ to ($R_{act}-1$), and to set the "COAST CONDITION" flag even though the ratio $N_t/N_e$ indicates that positive torque is being transmitted through torque converter 24.

Once the "COAST CONDITION" flag has been set, indicating that CDS conditions are present and that the active coast tests have been met, the neutral idle speed capture routine 496 is executed. Initially, the decision block 536 is executed to determine if the desired ratio $R_{des}$ is first. If $R_{des}$ is first, and first is engaged, as determined at decision block 537 by comparing $R_{des}$ with $R_{act}$, the instruction block 538 is executed to clear the "ACTIVE CDS" flag.

If the desired speed ratio $R_{des}$ is other than first, the decision block 540 is executed to determine if the "ACTIVE CDS" flag is set. If so, the neutral idle speed $N_i$ has already been captured, and the remainder of the routine is skipped, as indicated by the flow diagram line 542. If not, the decision block 544 is executed to compare the ratio $N_t/N_e$ with the reference term COASTHR, defined above in reference to FIG. 6.

If the ratio $N_t/N_e$ is at least as great as COASTHR, the instruction block 546 is executed to set the "COASTBIT" flag, indicating the impending passage of the ratio $N_t/N_e$ through unity. In such case, the decision blocks 548 and 550 are executed to compare the ratio $N_t/N_e$ with the reference terms HI and LO (also defined in reference to FIG. 6) for determining if the ratio is within the window defined thereby. If the ratio $N_t/N_e$ is within the window and the "COASTBIT" flag is set, as determined at decision block 552, the instruction block 554 is executed to clear the "COASTBIT" flag and to average the current turbine speed $N_t$ into the stored neutral idle speed $N_i$.

If the ratio $N_t/N_e$ is not within the window or if the "COASTBIT" flag is not set, the execution of instruction block 554 is skipped, as indicated by the flow diagram line 556. Thus, the neutral idle speed $N_i$ is only captured after the ratio $N_t/N_e$ has exceeded the term COASTHR. As indicated above, the neutral idle speed is estimated and stored in the control unit 270 when the engine is started. In subsequent operation the stored neutral idle speed $N_i$ adjusted by the averaging technique of instruction block 554.

The neutral idle speed capture routine 496 also includes a provision for determining the reasonableness of the stored neutral idle speed $N_i$. Whenever the ratio indicates that negative or braking torque is being transmitted across the torque converter 24, the decision block 558 is executed to determine if the current turbine speed $N_t$ is greater than the stored neutral idle speed $N_i$. If the stored neutral idle speed is correct, the decision block 558 will be answered in the affirmative. However, if the stored neutral idle speed is too high, the decision block 558 may be answered in the negative. In such case, the instruction block 560 is executed to average the current turbine speed $N_t$ into the stored neutral idle speed to bring the stored value into line with the actual neutral idle speed. The condition of negative or braking torque is determined by the decision blocks 544 and 562 which detect when the ratio $N_t/N_e$ is between the terms COASTHR and DRIVETHR, and the decision block 548 which further detects if the ratio is greater than the reference term HI. If the decision block 562 is answered in the negative, negative or braking torque is not indicated, and the instruction block 564 is executed to clear the "COASTBIT" flag.

In the above manner, errors of neutral idle speed overestimation (stored neutral idle speed too high) can be at least partially corrected early in the coast operation prior to the capture of the actual neutral idle speed. Errors of underestimation (stored neutral idle speed too low) are corrected solely by the neutral idle speed capture as described above in reference to the instruction block 554.

The shift timing routine 498 is initiated by comparing the predicted turbine speed for the downshifted speed ratio $PTS_n$ with the stored neutral idle speed $N_i$, as indicated by the instruction block 566. When $PTS_n$ is less than or equal to $N_i$ and the "ACTIVE CDS" flag is not set, as determined at the decision block 568, the downshift is initiated by executing the instruction blocks 570-572 to set the "ACTIVE CDS" flag, to set the desired speed ratio $R_{des}$ equal to the coast downshift ratio $R_{cds}$, and to decrement $R_{cds}$.

If it is determined at decision block 568 that the "ACTIVE CDS" flag is set, another coast downshift is in progress, and the instruction block 574 is executed to force such shift to its logical conclusion by setting the desired speed ratio $R_{des}$ equal to the actual ratio $R_{act}$, clearing the "SHIFT IN PROGRESS" flag, resetting the "FILL START" flag, and decrementing the coast downshift ratio $R_{cds}$. This situation occurs under relatively high rates of deceleration as illustrated in FIG. 7, where the downshift to an intermediate forward speed ratio, second for example, is skipped.

If it is determined at the decision block 566 that the predicted turbine speed $PTS_n$ is greater than the stored neutral idle speed $N_i$, the decision block 576 is executed to determine if the "ACTIVE CDS" flag is set. If not, the remainder of the routine is skipped, as indicated by the flow diagram line 578. If so, the blocks 537 and 538 are executed to compare the current speed ratio $R_{act}$ with the desired speed ratio $R_{des}$, and to clear the "ACTIVE CDS" flag if it is determined that the desired speed ratio $R_{des}$ has been achieved.

The blocks in FIG. 9 generally designated by the reference numeral 584 set forth an approach which may be used in lieu of the approach set forth at instruction block 566. Essentially, the moment for releasing the active clutching device may be identified either by computing a predicted turbine speed $PTS_n$ and comparing it to the stored neutral idle speed $N_i$ as described above, or by computing a neutral idle speed offset and comparing it to the turbine speed in the downshifted speed ratio. As set forth at the instruction block 585, the neutral idle speed offset is computed as a function of the stored neutral idle speed $N_i$, the vehicle acceleration a, the predetermined time $T_p$ (0.25 sec), and the downshifted speed ratio. The turbine speed in the downshifted speed ratio $N_{tds}$ is computed as a function of the current vehicle speed $N_v$ and the ratio $N_t/N_o$ defined by the downshifted speed ratio, as indicated at instruction block 586. When the turbine speed in the downshifted speed ratio equals the neutral idle speed offset, as determined at decision block 587, the decision block 568 is executed to determine if the "ACTIVE CDS" flag is set as described above.

As indicated above, the flow diagrams of FIGS. 10 and 11 set forth the clutch and PRV pressure determination algorithm generally referred to at the main loop instruction block 478 of FIG. 8. On entering such algorithm, the blocks designated generally by the reference numeral 588 are executed to set up initial conditions if a shift is in order. If a shift is in order, the blocks designated generally by the reference numeral 590 are executed to develop pressure commands for the clutching devices involved in the shift. Thereafter, the instruction blocks 592 and 594 are executed to determine pressure commands for the nonshifting clutches and the pressure regulator valve PRV, completing the routine. As indicated at instruction block 594, the pressure command for the regulator valve PRV is set equal to the highest of the pressure commands for the various clutching devices.

The blocks designated by the reference numeral 588 include the blocks 596–604. The decision block 596 determines if a shift is in progress as indicated by the "SHIFT IN PROGRESS" flag; the decision block 598 determines if the actual speed ratio $R_{act}$ is equal to the desired speed ratio $R_{des}$ determined at instruction block 476 of FIG. 8; and the instruction block 600 sets up the initial conditions for a ratio shift. The decision block 602 and the instruction block 604 set up an initial condition for a coast downshift. The blocks 600–604 are only executed when decision blocks 596 and 598 are both answered in the negative. In such case, instruction block 600 serves to set the old ratio variable, $R_{old}$, equal to $R_{act}$, to set the "SHIFT IN PROGRESS" flag, clear the shift timers, and to calculate the fill time $t_{fill}$ for the on-coming clutching device. Then the decision block 602 determines if the "ACTIVE CDS" flag is set. If so, the instruction block 604 is executed to set the CDS FILL START TIMER to the difference $(T_p - t_{fill})$. If the "ACTIVE CDS" flag is not set, the execution of instruction block 604 is skipped as indicated by the flow diagram line 606. If a shift is in progress, the execution of blocks 598–604 is skipped, as indicated by the flow diagram line 608. If no shift is in progress, and decision block 598 is answered in the affirmative, the execution of blocks 600–604 and the blocks designated by the reference numeral 590 is skipped, as indicated by the flow diagram line 610.

The blocks designated by the reference numeral 590 include the decision block 612 for determining if the shift is an upshift or a downshift; the instruction block 614 for developing pressure commands for the on-coming and off-going clutching devices if the shift is an upshift; and the instruction block 616 for developing the pressure commands for the on-coming and off-going clutching devices if the shift is a downshift. Since the present invention concerns downshifting, the steps involved in the downshift logic and control function identified by instruction block 616 are set forth in greater detail in the flow diagram of FIG. 11.

On entering the flow diagram of FIG. 11, the decision block 620 is executed to determine if the fill phase of the shift is completed, as indicated by the "FILL COMP" flag. If not, the flow diagram branch generally designated by the reference numeral 622 is executed; if so, the flow diagram branch generally designated by the reference numeral 624 is executed.

The flow diagram branch 622 includes a fill initializing routine comprising the blocks 626–632, and a fill completion routine comprising the blocks 638 and 640. At the beginning of each shift, the "FILL COMP" flag is not set, and the decision block 626 of the fill initializing routine is executed to determine if the fill phase has started, as indicated by the "FILL START" flag. Initially, the "FILL START" flag is not set, and decision block 628 is executed to determine if the "ACTIVE CDS" flag is set. If not, the instruction block 630 is executed to set the energization duty cycle of the on-coming clutching device, DC(ONC), equal to 100%, to set the "FILL START" flag, and to start the FILL TIMER. If the "ACTIVE CDS" flag is set, the decision block 632 is executed to determine if the count in the CDS FILL START TIMER is zero. If not, the predetermined time $T_p$ (0.25 sec) has not expired and the remainder of the fill routine is skipped, as indicated by the flow diagram line 634. If the count is zero, the instruction block 630 is executed to initiate the fill phase of the downshift as described above. Thereafter, decision block 626 is answered in the affirmative, and execution of the blocks 628–632 is skipped, as indicated by the flow diagram line 636.

Decision block 638 of the fill completion routine determines if the count in FILL TIMER is greater than or equal to the fill time $t_{fill}$ determined at instruction block 600 of FIG. 10. If so, instruction block 640 is executed to set the "FILL COMP" flag. If decision block 638 is answered in the negative, the fill phase is incomplete, and execution of the instruction block 640 is skipped, as indicated by the flow diagram line 642.

The flow diagram branch 624 includes a shift initializing routine comprising the blocks 644-650, and a shift completion routine comprising the blocks 652-662. Decision block 644 of the initializing routine determines if the "FILL COMP" flag has just been set, as indicated by the status of the "FIRST FILL" flag. If so, the instruction blocks 646 and 648 are executed to set up the torque and inertia phases of the shift. Instruction block 646 determines the pressure parameters $P_i$, $P_f$, and $t_f$ for the on-coming (ONC) and off-going (OFG) clutching devices as a function of an engine torque related variable $T_v$, the parameters $P_i$, $P_f$, and $t_f$ being defined in Graphs C and D of FIG. 4. Such determination is set forth in detail in a co-pending U.S. Patent Application Ser. No. 802,676, filed Nov. 29, 1985, which application is incorporated herein by reference. Instruction block 648 starts an inertia phase timer IP TIMER, and resets the "FIRST FILL" flag. Thereafter, the decision block 644 is answered in the negative, and the instruction block 650 is executed to calculate the percent of ratio shift completion, % RATCOMP.

In the inertia phase completion routine, the decision blocks 652 and 654 are executed to determine if the count in IP TIMER is at a maximum value, MAX, or if the term % RATCOMP is substantially equal to 100%. If either of the decision blocks 652 or 654 are answered in the affirmative, the shift is complete and instruction block 656 is executed to reset the "SHIFT IN PROGRESS" flag, to clear the "ACTIVE CDS" flag, to set the on-coming duty cycle DC(ONC) equal to 100%, and to set the off-going duty cycle DC(OFG) equal to 0%. If both decision blocks 652 and 654 are answered in the negative, the instruction block 658 is executed to determine the on-coming and off-going pressure commands, P(ONC) and P(OFG), as a function of the $P_i$, $P_f$, $t_f$, and IP TIMER values. This function is also set forth in detail in the above-referenced U.S. Ser. No. 802,676. Thereafter, the blocks 660-662 are executed to set the pressure command for the active (off-going) clutching device to zero if the "ACTIVE CDS" flag is set.

As set forth above, the coast downshift control of this invention effects minimal driveline disruption downshifts and places the transmission in a suitable speed ratio throughout the course of the coast operation so that further downshift need not necessarily occur if and when the operator terminates the coast operation. While the invention has been described in reference to the illustrated embodiment, various modifications thereto will occur to those skilled in the art, and controls incorporating such modifications may fall within the scope of this invention which is defined by the appended claims.

The embodiments of the invention in which an exclusive property or privilege is claimed are defined as follows:

1. In a motor vehicle having an engine drivingly connected to a vehicle wheel through a fluid coupling and a multiple speed ratio transmission, where the fluid coupling includes an impeller connected to the engine and a turbine connected to the transmission, the transmission being shiftable from an upper speed ratio to a lower speed ratio by releasing a friction element associated with the upper speed ratio and applying a friction element associated with the lower speed ratio, and the motor vehicle being operable in a coast mode wherein the vehicle wheel and transmission drive the turbine faster than the engine drives the impeller until the engine speed falls below its no-load idle speed after which the engine drives the impeller faster than the vehicle wheel and transmission drive the turbine, a method of controlling the apply and release of the transmission friction elements to effect a shifting of the transmission from the upper speed ratio to the lower speed ratio as the vehicle speed is reduced in the course of a coast mode of operation, such method comprising the steps of:

maintaining the apply of the friction element associated with the upper speed ratio at least until the engine speed is driven below said no-load idle speed; and thereafter releasing the transmission friction element associated with the upper speed ratio and subsequently when the impeller and turbine speeds substantially coincide applying the transmission friction element associated with the lower speed ratio such that (1) in the neutral interval between such release and such subsequent apply the engine speed substantially returns to said no-load idle speed, and (2) the engine speed immediately before and after the applying of the transmission friction element associated with the lower speed ratio is substantially equal, whereby torque fluctuations at the vehicle wheel are minimized.

2. The method as set forth in claim 1, including the step of:

determining the no-load idle speed of the engine at the onset of the coast mode of operation by monitoring a relation respecting the speeds of rotation of the impeller and turbine, and identifying the engine speed at which the turbine and impeller are driven at substantially the same speed.

3. The method as set forth in claim 1, including the steps of:

estimating the neutral idle speed of the engine at the initiation of engine operation and storing an indication representative thereof for use in timing the release of the friction element associated with the upper speed ratio;

monitoring a relation respecting the speeds of rotation of the impeller and turbine at the onset of a coast mode of operation, and identifying the actual no-load idle speed at which the turbine and impeller substantially coincide; and adjusting the stored indication of neutral idle speed by an amount determined in relation to the identified actual neutral idle speed, thereby to update the stored indication in accordance with current engine operating conditions.

4. In a motor vehicle having an engine drivingly connected to a vehicle wheel through a fluid coupling and a multiple speed ratio transmission, where the fluid coupling includes an impeller connected to the engine and a turbine connected to the transmission, the transmission being shiftable from an upper speed ratio to a lower speed ratio by releasing a friction element associated with the upper speed ratio and applying a friction element associated with the lower speed ratio, and the motor vehicle being operable in a coast mode wherein the vehicle wheel and transmission drive the turbine faster than the engine drives the impeller until the engine speed falls below its no-load idle speed after which the engine drives the impeller faster than the vehicle wheel and transmission drive the turbine, a method of controlling the apply and release of the transmission friction elements to effect a shifting of the transmission from the upper speed ratio to the lower speed ratio as the vehicle speed is reduced in the coarse of a coast mode of operation, such method comprising the steps of:

determining as a function of the current vehicle speed the speed at which the vehicle wheel and transmission would drive the turbine assuming engagement of the lower speed ratio, and predicting as a function of the current vehicle deceleration the value of such speed a predetermined time interval in the future, such predetermined time interval being determined in relation to the characteristic time required for the engine speed to return to its no-load idle value from a lower value when the engine load is removed; and releasing the friction element associated with the upper speed ratio to remove the engine load when the predicted turbine speed coincides with the no-load idle speed of the engine thereby initiating a neutral interval in which the engine speed increases substantially to its no-load idle speed, and applying the friction element associated with the lower speed ratio a predetermined time interval thereafter, such engagement substantially coinciding with the substantial return of the engine to its no-load idle speed whereby the engine speeds immediately before and after such apply are substantially equal.

5. The method as set forth in claim 4, including the step of:

determining the no-load idle speed of the engine at the onset of the coast mode of operation by monitoring a relation respecting the speeds of rotation of the impeller and turbine, and identifying the engine speed at which the turbine and impeller are driven at substantially the same speed.

6. The method as set forth in claim 4, including the steps of:

estimating the neutral idle speed of the engine at the initiation of engine operation and storing an indication representative thereof for use in timing the release of the friction element associated with the upper speed ratio;

monitoring a relation respecting the speeds of rotation of the impeller and turbine at the onset of a coast mode of operation, and identifying the actual no-load idle speed at which the turbine and impeller substantially coincide; and adjusting the stored indication of neutral idle speed by an amount determined in relation to the identified actual neutral idle speed, thereby to update the stored indication in accordance with current engine operating conditions.

7. In a motor vehicle having an engine drivingly connected to a vehicle wheel through a fluid coupling and a multiple speed ratio transmission, where the fluid coupling includes an impeller connected to the engine and a turbine connected to the transmission, the transmission is shiftable from an upper speed ratio to a lower speed ratio by releasing a friction element associated with the upper speed ratio and applying a friction element associated with the lower speed ratio, and the motor vehicle is operable in a coast mode of operation wherein the vehicle wheel and transmission drive the turbine faster than the engine drives the impeller until the engine speed falls below its no-load idle speed after which the engine drives the impeller faster than the vehicle wheel and transmission drive the turbine, a method of controlling the apply and release of the transmission friction elements to effect shifting of said transmission from said upper speed ratio to said lower speed ratio as the vehicle speed is reduced in the course of a coast mode of operation, such method comprising the steps of:

computing as a function of the current vehicle speed the speed at which the vehicle wheel and transmission would drive the turbine assuming engagement of the lower speed ratio, and predicting as a function of the current vehicle deceleration the value of such computed speed a predetermined time prior to its reaching the neutral idle speed of the engine, such predetermined time bearing a relation to the characteristic time required for the engine speed to retrun to its no-load idle value from a lower value when the engine load is removed;

releasing the friction element associated with the upper speed ratio when the computed tubine speed reaches the predicted turbine speed to thereby initiate a neutral interval during which the engine speed increases toward its no-load idle speed; and applying the friction element associated with the lower speed ratio a predetermined time after the release of the friction element associated with the upper speed ratio so that such apply substantially coincides with the return of the engine to its no-load idle speed, whereby the engine speeds immediately before and after such apply are substantially equal and torque fluctuations at the vehicle wheel are minimized.

8. The method as set forth in claim 7, including the step of:

determining the no-load idle speed of the engine at the onset of the coast mode of operation by monitoring a relation respecting the speeds of rotation of the impeller and turbine, and identifying the engine speed at which the turbine and impeller are driven at substantially the same speed.

9. The method as set forth in claim 7, including the steps of:

estimating the neutral idle speed of the engine at the initiation of engine operation and storing an indication representative thereof for use in timing the release of the friction element associated with the upper speed ratio;

monitoring a relation respecting the speeds of rotation of the impeller and turbine at the onset of a coast mode of operation, and identifying the actual no-load idle speed at which the turbine and impeller substantially coincide; and adjusting the stored indication of neutral idle speed by an amount determined in relation to the identified actual neutral idle speed, thereby to update the stored indication in accordance with current engine operating conditions.

10. In a motor vehicle having an engine drivingly connected to a vehicle wheel through a fluid coupling and a transmission adapted to provide a low gear and at least two other gears providing successively higher forward speed ratios than said low gear, where the fluid coupling includes an impeller connected to the engine and a turbine connected to the transmission, the transmission is shiftable from a current speed ratio to a desired speed ratio by releasing a friction element associated with such current speed ratio an applying a friction element associated with such desired speed ratio, and the motor vehicle is operable in a coast mode of operation wherein the vehicle wheel and transmission drive the turbine faster than the engine drives the impeller until the engine speed falls below its no-load idle speed after which the engine drives the impeller faster than the vehicle wheel and transmission drive the turbine, a method of controlling the apply and release of the transmission friction elements to effect successive shifting of said transmission from one of said other gears to said low gear as the vehicle speed is reduced in the course of a coast mode of operation, such method comprising the steps of:

maintaining the apply of the friction element associated with the gear engaged at the onset of the coast mode of operation, at least until the engine speed is driven below said no-load idle speed; and thereafter releasing the friction element associated with such gear and subsequently when the impeller and turbine speeds substantially coincide applying the friction element associated with a gear which provides a lower speed ratio than the engaged gear until the low gear is engaged, each such release and apply being carried out such that (1) in the neutral interval between the release and subsequent apply of respective friction devices, the engine speed substantially returns to its no-load idle speed, and (2) the engine speed immediately before and after the applying of each such friction element is substantially equal, thereby to minimize the resulting torque fluctuations at the vehicle wheel.

11. A method as set forth in claim 10, including the step of:

inhibiting the apply of the friction element associated with any of said other gears which provide a lower speed ratio than the engaged gear in the course of the coast mode of operation if the release of such friction element is required prior to its apply, thereby to extend the neutral interval and skip the engagement of one or more of said other gears in the presence of relatively high vehicle deceleration.

12. In a motor vehicle having an engine drivingly connected to a vehicle wheel through a fluid coupling and a transmission adapted to provide a low forward speed ratio and at least two successively higher foeward speed ratios, where the fluid coupling includes an impeller connected to the engine and a turbine connected to the transmission, the transmission is shiftable from a current speed ratio to a desired speed ratio by releasing a friction element associated with such current speed ratio and applying a friction element associated with such desired speed ratio, and the motor vehicle is operable in a coast mode of operation wherein the vehicle wheel and transmission drive the turbine faster than the engine drives the impeller until the engine speed falls below its no-load idle speed after which the engine drives the impeller faster than the vehicle wheel and transmission drive the turbine, a method of controlling the apply and release of the transmission friction elements to effect successive shifting of said transmission from the current forward speed ratio to said low forward speed ratio as the vehicle speed is reduced in the course of a coast mode of operation, such method comprising the steps of:

begining at the onset of the coast mode of operation, computing the speed at which the vehicle wheel and transmission would drive the turbine assuming engagement of a successively lower transmission speed ratio, and predicting as a function of the current vehicle deceleration the value of such speed a predetermined time interval in the future, such predetermined time interval bearing a relation to the characteristic time required for the engine speed to return to its no-load idle value from a lower value when the engine load is removed;

releasing the friction element associated with the currently engaged speed ratio to remove the engine load when the predicted turbine speed for the successively lower transmission speed ratio coincides with the no-load idle speed of the engine, thereby initiating a neutral interval during which the engine speed increases substantially to its no-load idle speed; and applying the friction element associated with the successively lower transmission speed ratio a predetermined time after the release of the friction device associated with the currently engaged speed ratio unless the predicted turbine speed for the next successively lower transmission speed ratio coincides with the no-load idle speed of the engine first, thereby to extend the neutral interval and skip the engagement of the successively lower transmission speed ratio when the vehicle deceleration is relatively high.

13. In a motor vehicle having an engine drivingly connected to a vehicle wheel through a fluid coupling and a transmission adapted to provide a low forward speed ratio and at least two successively higher forward speed ratios, where the fluid coupling includes an impeller connected to the engine and a turbine connected to the transmission, the transmission is shiftable from a current speed ratio to a desired speed ratio by releasing a friction element associated with such current speed ratio and applying a friction element associated with such desired speed ratio, and the motor vehicle is operable in a coast mode of operation wherein the vehicle wheel and transmission drive the turbine faster than the engine drives the impeller until the engine speed falls below its no-load idle speed after which the engine drives the impeller faster than the vehicle wheel and transmission drive the turbine, a method of controlling the apply and release of the transmission friction elements to effect successive shifting of said transmission from the current forward speed ratio to said low forward speed ratio as the vehicle speed is reduced in the course of a coast mode of operation, such method comprising the steps of:

begining at the onset of the coast mode of operation, computing the speed at which the vehicle wheel and transmission would drive the turbine assuming engagement of a successively lower transmission speed ratio, and predicting as a function of the current vehicle deceleration the value of such computed speed a predetermined time prior to its reaching the no-load idle speed of the engine, such predetermined time bearing a relation to the characteristic time required for the engine speed to return to its no-load idle value from a lower value when the engine load is removed;

releasing the friction element associated with the currently engaged speed ratio to remove the engine load when the computed turbine speed for the successively lower speed ratio reaches the predicted turbine speed for such successively lower speed ratio to thereby initiate a neutral interval during which the engine speed increases substantially to its no-load idle speed; and applying the friction element associated with the successively lower transmission speed ratio a predetermined time after the release of the friction device associated with the currently engaged speed ratio unless the computed and predicted turbine speeds for the next successively lower transmission speed ratio coincide, thereby to extend the neutral interval and skip the engagement of the successively lower transmission speed ratio when the vehicle deceleration is relatively high.

* * * * *